Sept. 19, 1944.   J. M. DONALDSON   2,358,564
FLANGE AND ANGLE LEVEL
Original Filed June 25, 1942   3 Sheets-Sheet 1

Inventor
Joseph M. Donaldson.

By Clarence A. O'Brien
and Harvey B. Jacobson
Attorneys

Inventor
Joseph M. Donaldson.

By Clarence A. O'Brien
and Harvey B. Jacobson
Attorneys

Sept. 19, 1944.   J. M. DONALDSON   2,358,564
FLANGE AND ANGLE LEVEL
Original Filed June 25, 1942   3 Sheets-Sheet 3
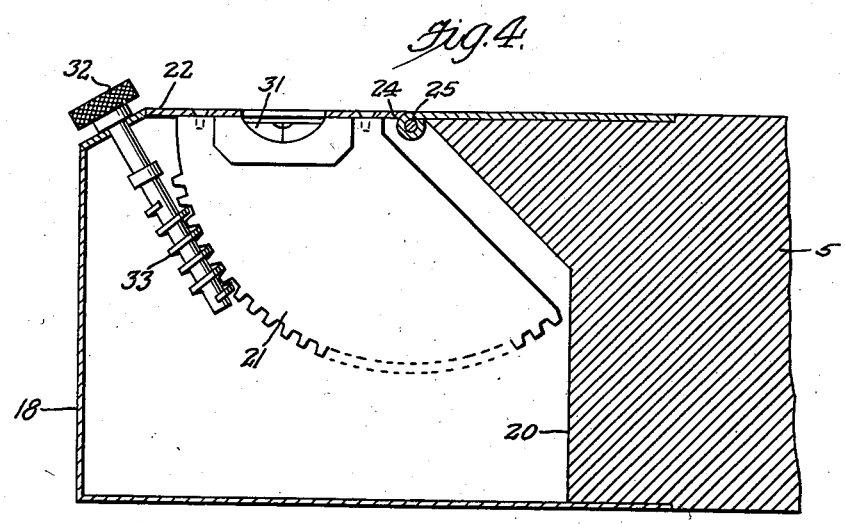
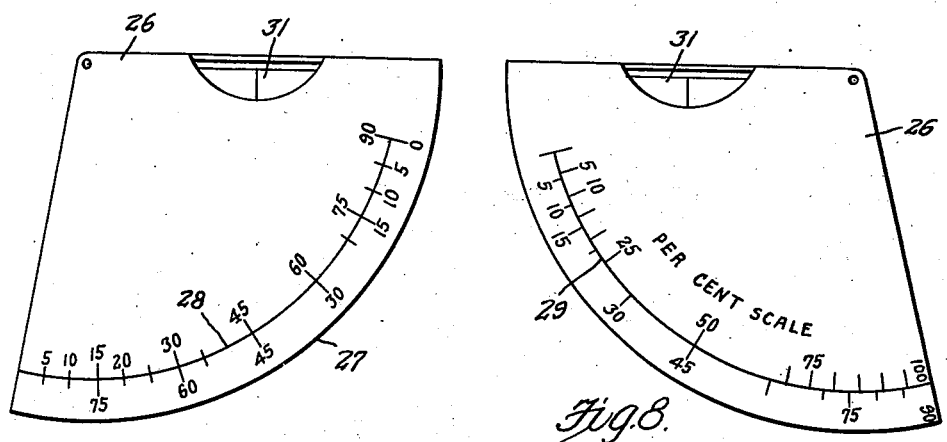
Inventor
Joseph M. Donaldson,
By
Clarence A. O'Brien
and Harvey B. Jacobson
Attorneys Patented Sept. 19, 1944

2,358,564

UNITED STATES PATENT OFFICE 2,358,564

FLANGE AND ANGLE LEVEL

Joseph M. Donaldson, El Segundo, Calif.

Original application June 25, 1942, Serial No. 448,466. Divided and this application March 26, 1943, Serial No. 480,695

1 Claim. (Cl. 33—214)

This is a divisional application of my co-pending application, Serial No. 448,466, filed June 25, 1942.

The present invention relates to new and useful improvements in levels and has for its primary object to provide in conjunction with a tool of this character, an adjustable spirit level tube carried by the tool by means of which the tube may be adjusted angularly to compensate for changes in the inclined position of the level when used upon certain types of work.

A further object resides in the details of construction and operation as more fully hereinafter described and claimed, reference being had to the accompanying drawings forming part hereof, wherein like numerals refer to like parts throughout, and in which:

Figure 4 is a fragmentary longitudinal sectional view showing the adjusting screw for the scales at the sides of the level.

Figure 7 is a side elevational view of one side of the scale.

Figure 8 is a similar view of the opposite side thereof, and

Figure 1:
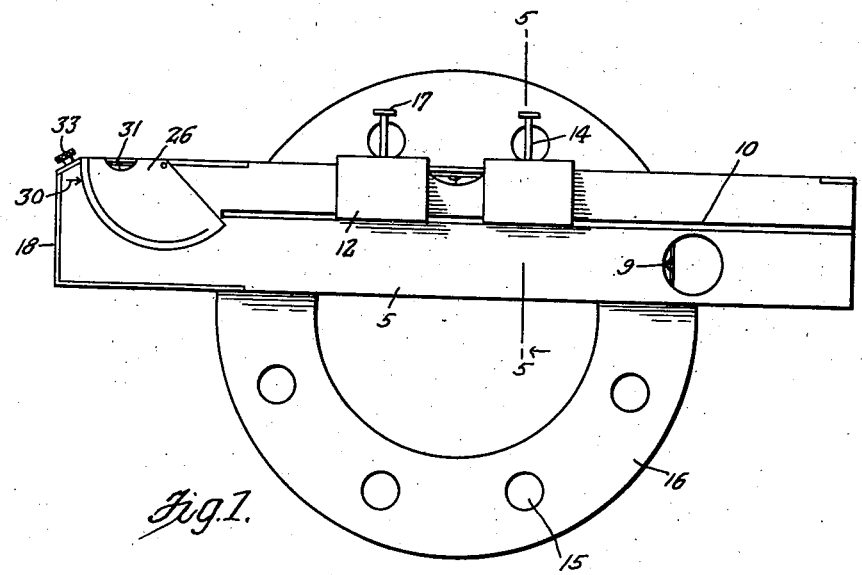
Figure 1 is a side elevational view showing the tool in position on a pipe flange.
Figure 5:
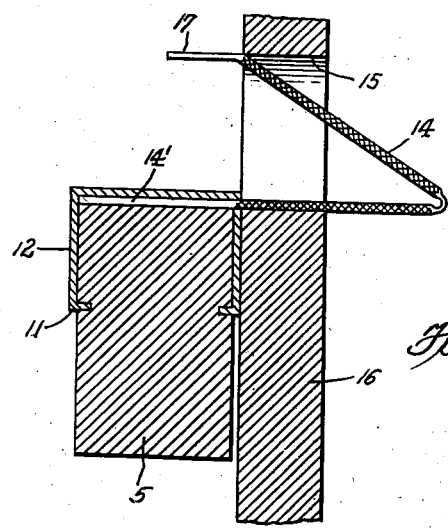
Figure 5 is a sectional view taken substantially on a line 5—5 of Figure 1.
Figure 9:
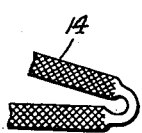
Figure 9 is a detail of the spring clip for attaching the level to a pipe flange.
Figure 2:
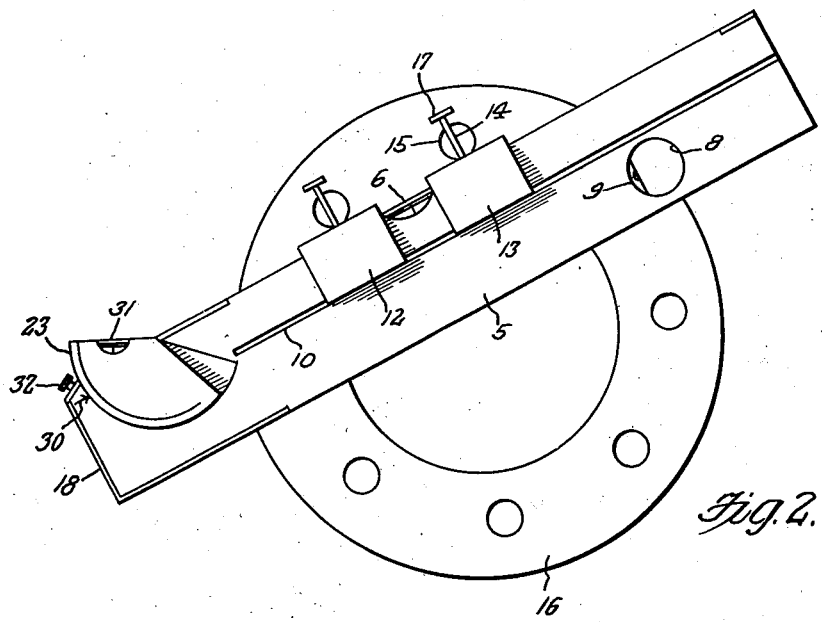
Figure 2 is a similar view showing the level mounted in an angular position from the horizontal on the pipe flange.
Figure 3:
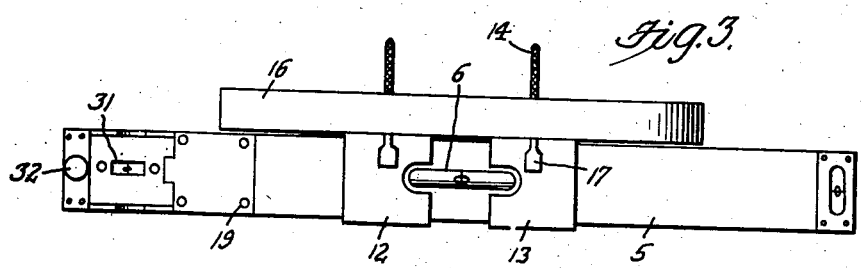
Figure 3 is a top plan view.
Figure 6:
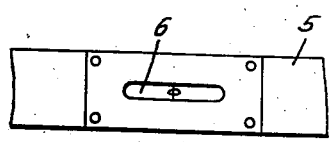
Figure 6 is a fragmentary top plan view showing the center spirit level.

Referring now to the drawings in detail, wherein for the purpose of illustration I have disclosed a preferred embodiment of the invention, the numeral 5 designates the body of a spirit level, which is of substantially rectangular shape in cross-section, and having a spirit level 6 mounted in its upper surface and with the tube of the spirit level extending longitudinally of the body, as shown to advantage in Figure 3 of the drawings, and also having a spirit level 7 in its upper surface with the tube of the spirit level disposed transversely thereof and adjacent one end of the body.

The body 5 is also provided with a transverse opening 8, in which a spirit level 9 is positioned with the tube extending vertically with respect to the body.

A groove 10 is formed in each side of the body extending longitudinally thereof in which are slidably received the inturned edges 11' formed on a pair of U-shaped slides 12 and 13, the slides being inverted on the upper edge of the body.

A spring clip 14 is carried by each of the slides, the spring clip being of substantially V-construction and having one end designated at 14' secured to the slide and projecting laterally from the body 5 at one side thereof for insertion in the openings 15 of a pipe flange 16, the free end 17 of the clip overlying the top of the body of the level and in spaced relation therefrom and terminating in a flat thumb piece to facilitate releasing of the clip from the opening. The surfaces of the clip 14 are serrated or corrugated to facilitate gripping engagement thereof with the interior of the openings 15 for securing the level in a desired position.

At one end of the body 5 is a plate member 18 extending along the bottom of the body, also upwardly along the adjacent end thereof and also along the top of the body and is secured thereto by rivets, screws or the like 19. A chamber 20 is formed in the body at one end thereof provided with the plate 18 and positioned in the chamber is a gear segment 21 having one edge secured to the underside of the bight portion 22 of a U-shaped scale member, designated generally at 23.

The top portion of the plate 18 is formed with an opening 24 at one edge of which is formed a hinge member 25 to which the bight portion 22 of the scale is hingedly connected. The scale member 23 also includes wings 26 at each side thereof having an arcuate edge 27 and the wings are recessed in opposite sides of the body 5 flush therewith. The outer surface of each of the wing members 26 is marked with graduations 28 and 29 adjacent the arcuate edge thereof and adapted to register with a stationary mark or indicator 30 on the side of the body to indicate the angular position of the body 5. The bight portion 22 of the scale member 23 is also provided with a spirit level 31 having its tube extending longitudinally with respect to the body 5.

The upper corner of the plate 18 is inclined or beveled, as indicated at 32, and positioned therein is an adjusting screw 33 engageable with the teeth of the gear segment 21 whereby to adjust the position of the scale member 23 on its pivot in a manner as will be apparent.

While I have illustrated the invention in a manner adapted for use in welding a flange to a pipe at the desired angle, it will be apparent the level may be used for many other purposes, and if desired the clips 14 and slides 12 and 13 may be removed when not needed.

It is believed the details of construction, operation and manner of use of the device will be readily understood from the foregoing without further detailed explanation.

Having thus described the invention what I claim is:

A level comprising a body, a pair of spaced interconnected plates positioned at opposite sides of the body and pivoted thereto, a spirit level carried by the interconnecting portion of said plates, said plates having graduations thereon and said body having a stationary pointer adjacent the graduations, a gear segment carried by the plates, and a worm gear operatively engaging the segment for pivotally adjusting the plates relative to the body.

JOSEPH M. DONALDSON.